United States Patent [19]
Popoff

[11] Patent Number: 4,943,136
[45] Date of Patent: Jul. 24, 1990

[54] OPTICAL BACKPLANE INTERCONNECTION

[75] Inventor: Alexander A. Popoff, Bellevue, Wash.

[73] Assignee: The Boeing Company, Seattle, Wash.

[21] Appl. No.: 282,379

[22] Filed: Dec. 9, 1988

[51] Int. Cl.$^5$ .............................................. G02B 6/28
[52] U.S. Cl. .............................. 350/96.16; 350/96.15
[58] Field of Search ............... 350/96.15, 96.16, 96.20, 350/96.22

[56] References Cited

U.S. PATENT DOCUMENTS

| | | | |
|---|---|---|---|
| 4,227,260 | 10/1980 | Vojvodich et al. | 455/601 |
| 4,234,968 | 11/1980 | Singh | 455/607 |
| 4,341,438 | 7/1982 | Seki et al. | 350/96.16 |
| 4,357,606 | 11/1982 | Fortescue | 350/96.16 |
| 4,365,864 | 12/1982 | Cowley et al. | 350/96.16 |
| 4,474,425 | 10/1984 | Kaede | 350/96.16 |
| 4,597,631 | 7/1986 | Flores | 350/96.20 |
| 4,653,845 | 3/1987 | Tremblay et al. | 350/96.16 |
| 4,653,849 | 3/1987 | Boirat et al. | 350/96.15 |
| 4,653,850 | 3/1987 | Boirat et al. | 350/96.15 |

OTHER PUBLICATIONS

Kieli, M. and Herczfeld, P., "Asymmetric Fiber-Optic Couple for LAN Applications", *Journal of Lightwave Technology*, vol. LT-4, No. 12, p. 1729, (Dec. 1986).
Wood, T., "Increased Power Injection in Multimode Optical-Fiber Buses Through Mode-Selective Coupling", *Journal of Lightwave Technology*, vol. LT-3, No. 3, p. 537, (Jun. 1985).
Note, "Guided-Wave Optical Chip-to-Chip Interconnections", *Electronics Letters*, vol. 23, No. 4, pp. 143-144, (Feb. 1987).
Forrest, S., "Optical Detectors: Three Contenders", *IEEE Spectrum*, pp. 76-84, (May 1986).
Note, "Photocor TM Fiber-Optic Star (n×n) Couplers", Preliminary Product Information from Corning Glass Works, a Telecommunications Products Div. of Corning, p. 3, (Sep. 1988).
Note, "Photocor TM Fiber-Optic Tree (1×n) Couplers", Product Information from Corning Glass Works, a Telecommunications Products Div. of Corning, p. 4, (Sep. 1988).
Kevin Murphy, "An Integrated Optics Technology for the Production of Photocor TM Fiber-Optic Components", a Technical Report from Corning Glass Works, a Telecommunications Products Div. of Corning, p. 12, (Sep. 1988).

*Primary Examiner*—William L. Sikes
*Assistant Examiner*—Robert E. Wise
*Attorney, Agent, or Firm*—Christensen, O'Connor, Johnson & Kindness

[57] ABSTRACT

An optical waveguide reflective star coupler array for interconnecting printed circuit boards or modules in a parallel and broadcast topology. The reflective star coupler array has N reflective star couplers, where N is the number of signal lines to be connected in parallel. Each reflective star coupler has M guide channels, where M is the number of circuit boards to be connected in the backplane configuration. Each guide channel extends between an input port and a mixer. The mixer has a reflective surface arranged so that light propagating along any one of the guide channels is reflected and evenly distributed by the mixer to all of the ports of the star coupler and, hence, to all of the Mth signal lines.

11 Claims, 7 Drawing Sheets

OPTICAL BACKPLANE INTERCONNECTION

BACKGROUND OF THE INVENTION

The present invention relates generally to optical methods of interconnecting electrical circuits to avoid the problems associated with electrical transmission line interconnections. More particularly, the invention concerns techniques for interconnecting printed circuit boards or modules in a parallel and broadcast topology an optical waveguide reflective star coupler array.

High speed multi-board digital processing system require inter-board interconnections. Many of these systems require a backplane bus interconnection topology consisting of many parallel data, clock and control signal lines. The operation of these high speed digital systems requires short clock cycle times in addition to high data rates. Systems with short clock cycle times require short, deterministic and precise propagation delays within the backplane interconnect. This is difficult to achieve without careful consideration of electrical transmission line propagation effects.

Currently for the interconnection of high speed digital circuit boards, impedance matched transmission lines are used. To design a continuous impedance transmission line it is necessary to utilize a continuous reference ground line or plane. For a bus topology on a backplane this continuity is difficult to acheive at all loading conditions, usually resulting in a compromise between reflections on the transmission line and packaging design complexity. Reflections on the backplane control lines cause undesired signal edges which are detrimental to systems that use edge triggered events. Reflections on the backplane data lines make it necessary for the system's designer to include a settling time so that the reflections will subside before the data is sent. This settling time must be added to the propagation delay of the transmission line and thus adds to the overall bus delay.

The propagation delay of the transmission line depends upon the distributed capacitance per unit length of the transmission line and distributed load capacitance per unit length. The fully loaded bus condition will usually result in the worst case propagation delay. For good system reliability, the system designer must consider this worst case propagation delay. As a consequence, there is a decrease in system performance under light load conditions. The load capacitances of the transceivers and connectors at each board also decrease the impedance of the bus and increase the propagation delay. Since in many systems the number of boards can be 8 to 32 or more, the resulting distributed load capacitance can be very high compared to the transmission line capacitance per unit length. The result is increased power consumption to drive a high fan out bus with the propagation delay being dependent upon the load and impedance matching conditions of the bus transmission line.

Other limitations of electrical busses are poor reliability due to the high pin count connectors required. A limitation with parallel transmission lines on the backplane is that the lines must be physically separated proportional to the bandwidth of the signals being propagated and the length that the lines are parallel to avoid crosstalk. With fast rising digital pulses the effective bandwidth of the signal is higher, resulting in additional crosstalk. Techniques such as digital trapezoidal waveforms have been implemented to minimize crosstalk problems, but at the expense of reduced signal bandwidth.

Optical methods for interconnecting circuits have been investigated in an effort to avoid the foregoing problems associated with the design of electrical transmission line interconnections. Optical interconnections have been explored because optical signals are immune from EMI effects, can provide dense interconnections with less crosstalk, and are free from loading effects on the propagation delay through the interconnection media.

In general, the topology required for the interconnection of a multi-board processing system is a parallel set of linear tapped broadcast busses. The number of parallel busses varies and is dependent upon the bus protocol and required data transfer rate of the system. By utilizing the bandwidth of an optical system and incorporating time-division and wavelength division multiplexing the required number of parallel busses can be reduced by an order of magnitude relative to the electrical transmission line methods. However, one major constraint of optical waveguide technology to the application of backplane interconnections is the lack of developed optical tapped couplers to implement linear tapped busses. Several methods to efficiently tap optical power from a multi-mode "trunk" fiber are known. However, the performance of these coupler is either mode population dependent, fiber type or geometry dependent, or labor intensive to fabricate.

For the optimum linear tapped bus performance, the tapped coupler must be bidirectional and asymmetric. In addition, the tapped powder ratio must be adjustable during the fabrication process of the tapped coupler and achieve low coupler excess loss. These required characteristics are difficult to simultaneously achieve in one coupler design. If all of these characteristics are not available in one coupler design, then compromises to the optimum linear tapped topology must be made. These compromises are either increased propagation delay, clock distribution skew, or increased receiver dynamic range and/or number of connections per signal line.

Transmissive star couplers have also been invetigated as a means for achieving a parallel broadcast topology for application to a backplane. The transmissive star coupler approach suffers from physical implementation limitations such as fiber band radius and requires separate transmit and receive fibers for each signal passed.

SUMMARY OF THE INVENTION

The present invention provides an optical backplane interconnect arrangement that overcomes the above-described problems associated with the electrical interconnections and with prior optical approaches, such as those using transmissive star couplers. In particular, an important aspect of the invention is the use of optical waveguide reflective star coupler arrays in conjunction with fiber-optic ribbon cable to interconnect a plurality of printed circuit boards or modules in a parallel backplane configuration. As a consequence of this appraoch, all attenuation paths between boards or modules are nearly equal so that a minimum dynamic range is required at the receiver. In addition, the invention makes it possible to keep all of the propagation path lengths equal so that the propagation delay is deterministic and not variable due to load conditions. The invention further makes possible the use of only one connector pin per optical signal line for both transmit and receive functions. As well, board/module failures can be isolated from other board/module operations and all transmitters can provide self checks on all data and control function transmissions. Still further, the invention eliminates the need in prior optical interconnection methods for different and precise tapping ratio couplers at each node.

In accordance with the invention, there is provided an optical coupling arrangement for interconnecting M optical cables from M boards in a backplane configuration. Each of the optical cables has N optical signal lines to be interconnected in parallel so that that Nth optical signal line of each of the M cables is connected to the Nth optical signal line of each other one of the M cables. The coupling arrangement include a reflective star coupler array having N reflective star couplers. Each of the reflective star couplers has M optical waveguide channels that extend between a common mixer region and one of M input/output ports. The mixer has a reflective surface arranged so that light propagating along any one of the guide channels is reflected by the reflective surface and distributed by the mixer to all of the N guide channels. The arrangment further includes an alignment matrix for connecting the optical cables to the reflective star coupler array. This alignment matrix has M×N alignment apertures that are arranged in a predetermined manner so that each aperture holds a specific one of the N optical signal lines in alignment with a specific one of the input/output ports of the reflective star couplers.

In accordance with one aspect of the invention, the optical cables are fiber-optic ribbon cables that are held in alignment with the reflective star coupler by M V-groove arrays. Each of the V-groove arrays has N generally V-shaped grooves that are spaced to correspond to the spacing between the individual reflective star couplers.

According to a further aspect of the invention, the reflective star coupler array, alignment matrix, and optical cables are used in conjunction with board-mounted optoelectronic bus transceivers to configure an optical backplane arrangement. In preferred form, each of the optoelectronic bus transceivers has N-pairs of optical transmitters and receivers electrically connected to an interface circuit and optically coupled to the ribbon cable through an optical coupler array having N 2×1 waveguide couplers.

In accordance with a further aspect of the invention, discrete arrays of optical transmitters and optical receivers are utilized in conjunction with an electronic interface circuit and a raised optical waveguide to configure the optoelectronic bus transceivers.

DETAILED DESCRIPTION OF THE PREFERRED EMBODIMENT

Figure 1:
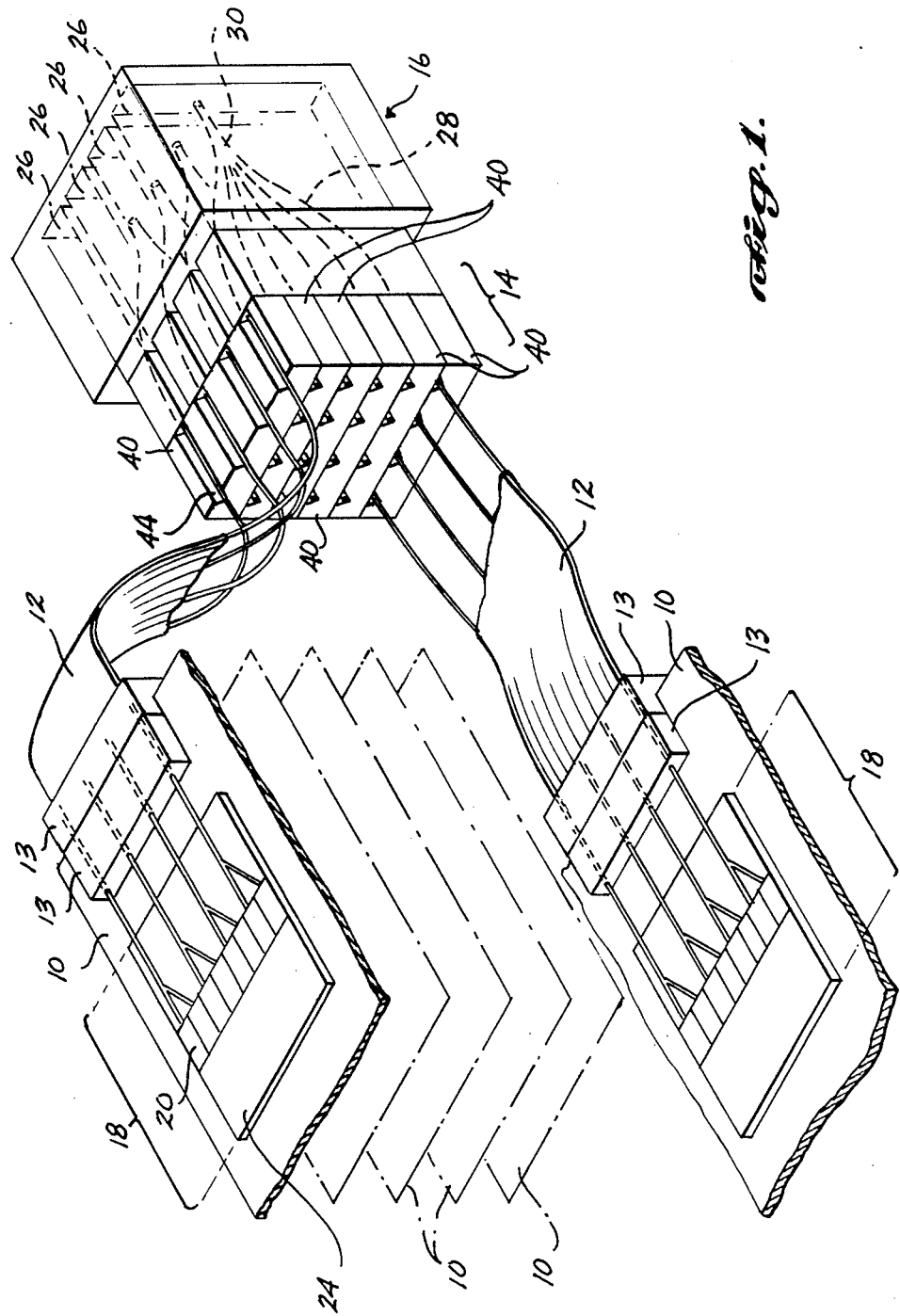
FIG. 1 is a diagrammatic, perspective view showing a plurality of circuit boards interconnected to a reflective star coupler array in a backplane configuration according to the invention.

Referring to FIG. 1, the optical waveguide backplane interconnection configuration of the present invention includes a plurality of circuit boards 10 connected through fiber-optic ribbon cables 12 and a V-groove alignment matrix 14 to an optical waveguide reflective star coupler array 16. Each of the circuit boards carries an optoelectronic bus transceiver 18, which is coupled to the fiber-optic ribbon cable 12 through a pair of multi-fiber board edge connectors 13. As will be explained in greater detail hereinafter in conjunction with FIG. 5, each of the optoelectronic bus transceivers 18 consists of an array 20 of optical transmitters and receivers that are individually addressable through an electronic interface circuit 24 and that communicate with the above-mentioned optical components through an array 22 of 2×1 waveguide couplers.

The configurations of the V-groove alignment matrix 14 and reflective star coupler array 16 are determined in part by the number of printed circuit boards to be interconnected and the number of optical signal lines that are to be connected in parallel. These parameters define an interconnection matrix for the optical backplane which is M×N, where M is the number of printed circuit boards to be interconnected and N is the number of parallel signal lines. In the FIG. 1 embodiment, there are M=6 printed circuit boards, and each board has N=4 signal lines to be connected in parallel. Thus, there is a 6×4 intereconnection matrix for this illustrated arrangement. It is, of course, to be understood that the invention is not limited to a matrix of this size.

Figure 2:
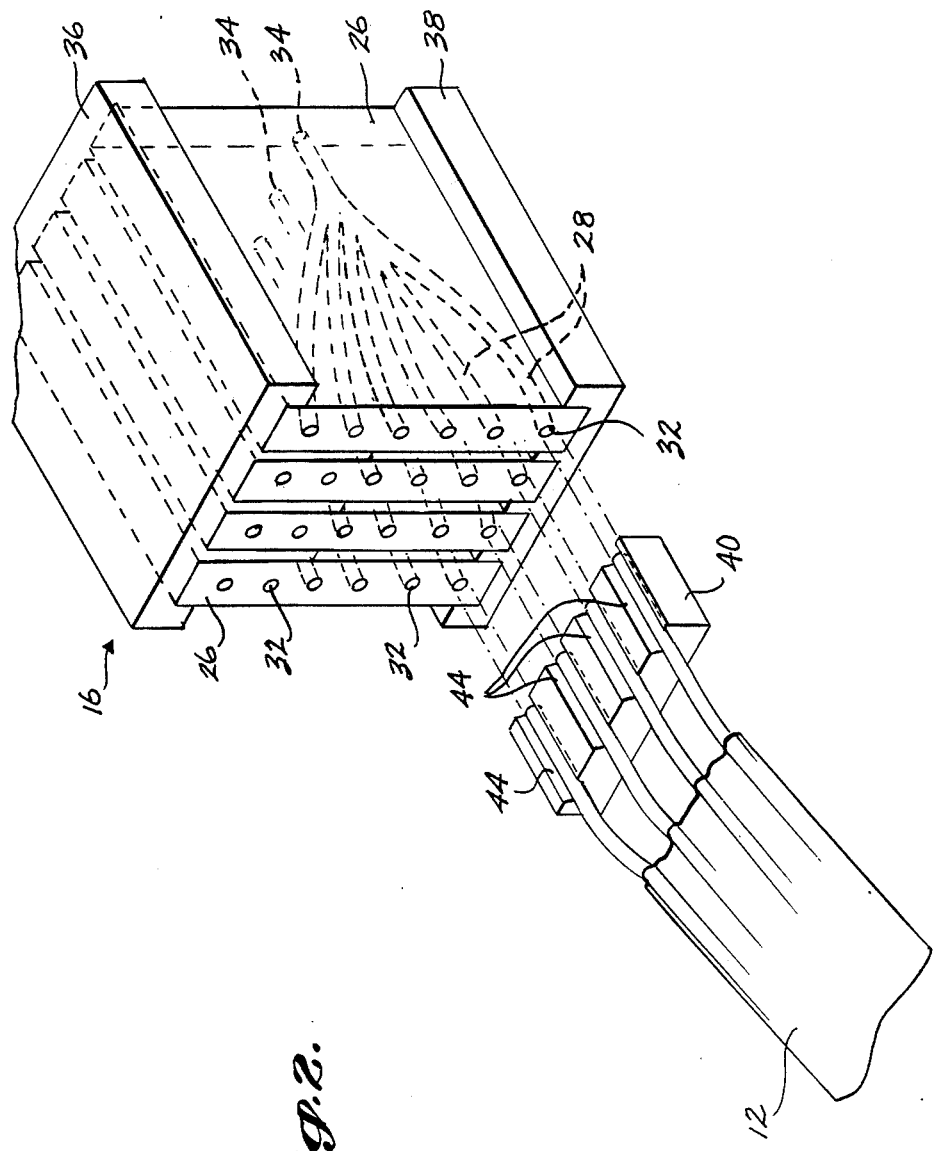
FIG. 2 is a diagrammatic, perspective view illustrating a technique for aligning the optical fibers with the reflective star couplers using a "horizontal" V-groove array.

To meet the constraints of the M×N matrix, the reflective star coupler array 16 is configured to have N=4 identical reflective star couplers 26. As best seen in FIG. 2, each of the reflective star couplers 26 has six (M=6) input waveguide channels 28 that extend from an input port 32 to a common, mixing guide channel, or mixer 30. The mixing guide channel terminates at a reflective surface 34 that lies at an end opposite an end formed by the convergence of the input channels 28. In operation, optical signals launched into any one of the input ports 32 propagates along an associated one of the input waveguide channels 28 into the mixer 30, is reflected by the reflective surface 34 and is returned to all of the input ports 32 via the input waveguide channels 28.

Figure 8:
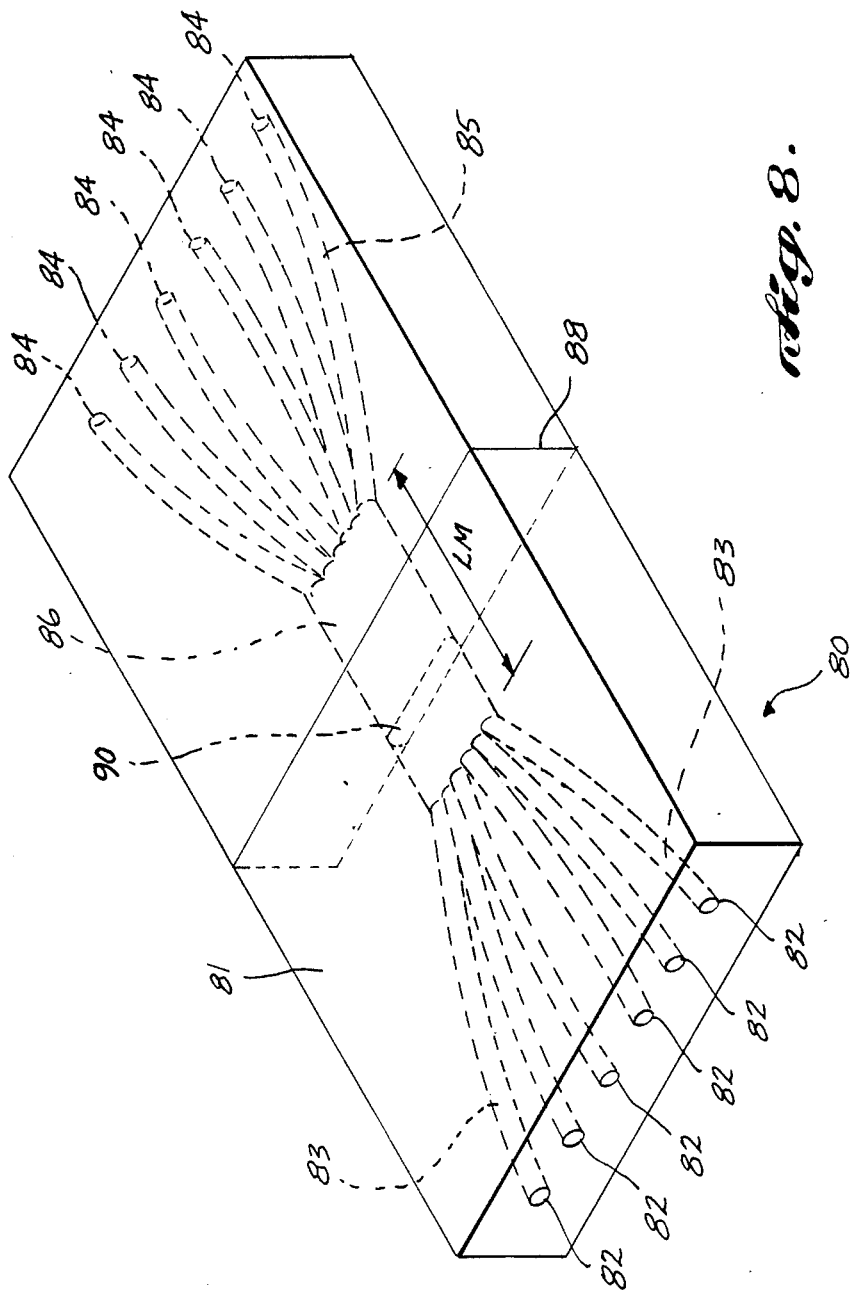
FIG. 8 is a diagrammatic perspective view of a step in a process for fabricating a reflective star coupler.

FIG. 8 illustrates a presently preferred procedure for fabricating the reflective star couplers 26 that begins with a planar waveguide star coupler 80. In general, such planar waveguide star couplers are known and are manufactured on suitable substrate materials, such as glass, silicon, GaAs, or LiNbO₃ using photolithographic techniques to meet waveguide requirements and alignment tolerances.

In the preferred embodiment under discussion, the star coupler 80 is an n×n multimode star coupler having n=6 input waveguides 83, n=6 output waveguides 85, and a central mixing region 86 integrated in a glass substrate 81. Each of the input optical waveguides 83 extends between the mixing region 86 and an input port 82 and each of the output optical waveguides extends between the mixing region and an output port 84. N×n star couplers of this type are commercially available from Corning Glass Works under the trademark PHOTOCOR. These star couplers have various numbers of ports and waveguides. For example, Model No. MGS 0404 has a 4×4 port arrangement; Model No. MGS 080 has an 8×8 arrangement, and Model MGS 1616 has a 16×16 configuration. It is to be understood that the six port arrangement shown in FIG. 8 is illustrative only and is not meant to imply that 6×6 star couplers are presently available from Corning Glass Works as commerical products. Of course, it is believed that a 6×6 star coupler could readily be manufactured using the same fabrication techniques as those used to manufacture the models just mentioned.

To form the desired reflective star coupler, the planar waveguide star coupler 80 is diced or cut along the midline 88 of the mixing region 86 to separate the star coupler into two halves. This midline 88 is located at the midpoint of the length $L_m$ of the mixing region 86. When the star coupler 80 is so cut, the midline portion of the mixing region 86 has an exposed surface 90 on the newly formed end of each of the halves. To complete the reflective star coupler, the surface 90 is polished and a highly reflective coating is applied thereto to form a reflective surface that is normal to the optical axis of the mixing region. Conveniently, this reflective coating is added by vacuum evaporation depositing a metal, such as aluminum or gold.

It is to be understood that the reflective star couplers 26 can be fabricated in other ways. For example, these couplers can be formed by adding a reflective coating to the end-polished single input port of a tree coupler. Tree couplers of this type, having one input port and multiple output ports, are sold by Corning Glass Works under the trademark PHOTOCOR. Examples of these tree couplers include Model No. MGC 2010, which has a 1×2 port configuration; Model No. MGC 6010, which has a 1×6 port configuration, and Model No. MGC 1610, which has a 1×6 port configuration.

Referring again to FIG. 2, the reflective star coupler array 16 is completed by assembling the required number of planar waveguide reflective star couplers 26 into upper and lower alignment structures 36 and 38, respectively. Each of these alignment structures has lengthwise channels that are configured and dimensioned to securely hold the reflective star couplers 26 in predetermined alignment with one another. By way of example, the alignment structures can be blocks of silicon into which the channels are formed using photolithographic techniques or other microelectronic processing techniques.

Referring now to FIG. 1, the V-groove alignment matrix 14 receives and holds the ends of the ribbon cables 12 so that each of the fiber-optic signal lines contained therein is maintained in precise alignment with a specific one of the input ports 32 on a particular one of the reflective star couplers 26. For this purpose, the matrix 14 has M=6 identically configured V-groove arrays 40 stacked on top of one another and fastened together in that position by an adhesive such as epoxy glue. As seen most clearly in FIG. 2, each of the V-groove arrays 40 has N=4 V-grooves 44 formed in an "upper" suface. These V-grooves 44 are formed on center spacings that are equal to the center spacings of the input ports 32 of the reflective star couplers 26 with which the optical fibers of the ribbon cable 12 are to be aligned. For descriptive purposes herein, this arrangement is referred to as a "horizontal" V-groove array since the fiber-optic ribbon cables 12 are held in a horizontal orientation from the perspective seen in FIGS. 1 and 2. This is a preferred approach for aligning the optical fibers with the reflective star coupler since the fibers for a given ribbon cable can be terminated all at once simply by laying the cable into the V-grooves 44.

Figure 3:
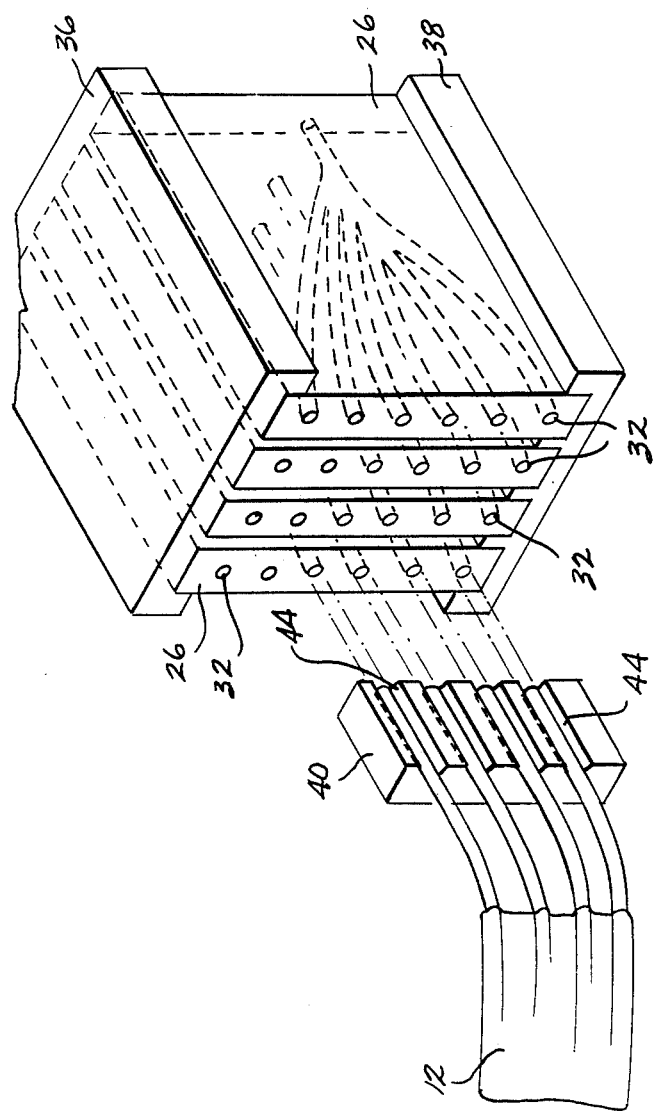
FIG. 3 is a diagrammatic, perspective view illustrating an alternative alignment technique utilizing a "vertical" V-groove array.

Alternatively, as shown in FIG. 3, the optical fibers can be aligned with the reflective star couplers by arranging the V-groove arrays 40 in a "vertical" orientation. With this approach, the optical fibers carried by a given V-groove array 40 are aligned with input ports 32 in only one reflective star coupler. This is to be contrasted with the "horizontal" approach of FIGS. 1 and 2 in which the optical fibers carried by a given V-groove array 40 are aligned with input ports 32 in each of the reflective star couplers 26.

The "vertical" alignment approach of FIG. 3 is further distinguishable in that this arrangement does not permit a one-step termination of all of the fibers of a given ribbon cable 12. Instead, with the "vertical" arrangement, it is necessary to fan out the fibers individually for the individual V-grooves.

According to another alternative approach, the V-grooves required for optical fiber alignment can be formed as an integral part of the reflective star couplers 26. For example, the V-grooves can be molded directly into the reflective star coupler substrate material. This alternative approach can be used for either the "horizontal" or "vertical" arrangements and has the benefit of eliminating separate V-groove arrays 40.

Figure 4:
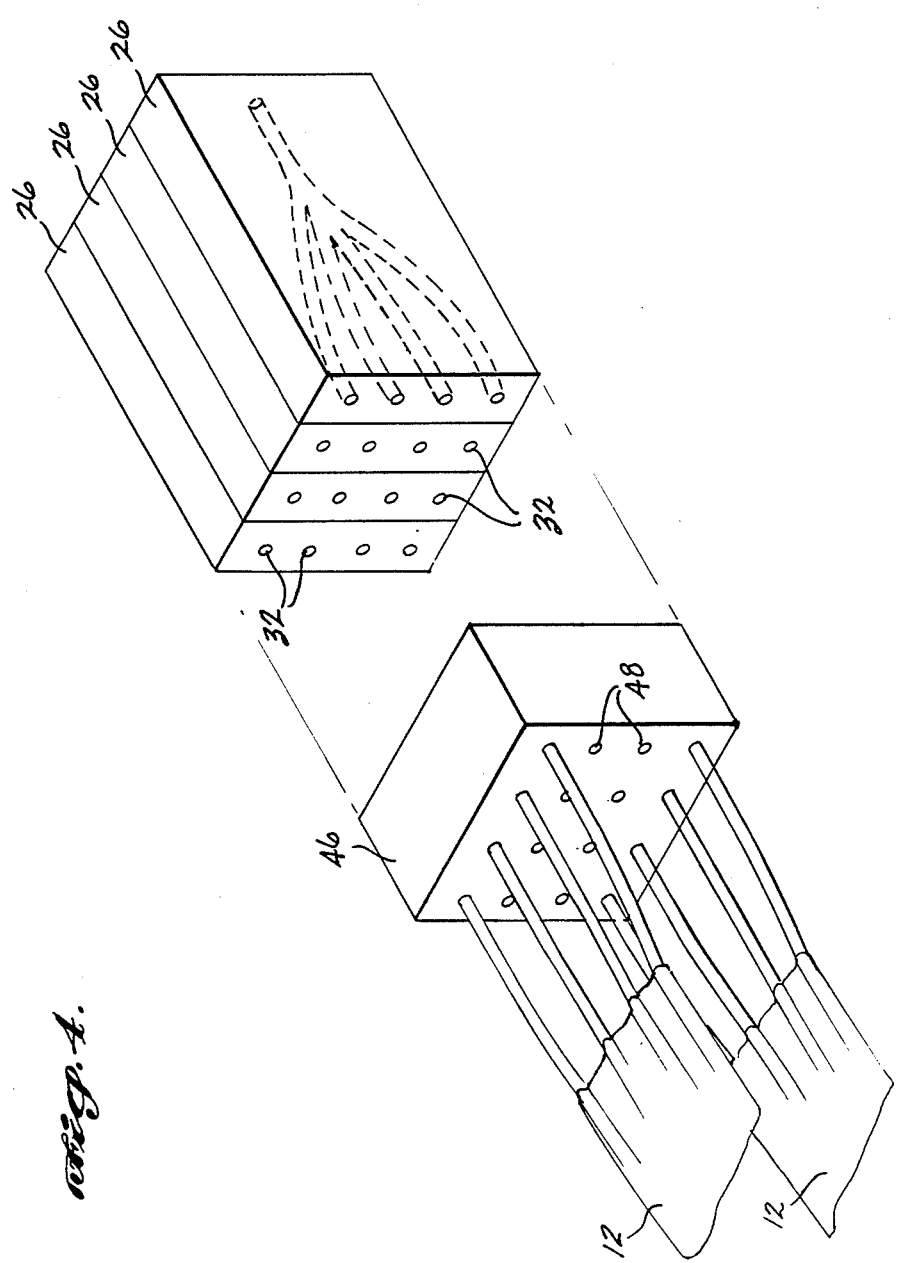
FIG. 4 is a diagrammatic, perspective view illustrating another alternative alignment technique using a circular hole array.

FIG. 4 illustrates another alternative technique for aligning the optical fibers with the reflective star couplers 26. According to this approach, a single circular hole array 46 receives and aligns each of the optical fibers with the star coupler input port with which it is to be associated. The circular hole array 46 is a block of material, such as a semiconductor, ceramic, or metal, through which are formed a plurality of holes, with the holes being suitable in number and appropriately spaced and oriented to achieve the desired alignment between the optical fibers and the input ports of the reflective star couplers. These holes can be formed by any suitable method, including mechanical drilling, laser drilling, chemical etching, and located by using photolithographic techniques.

Figure 5:
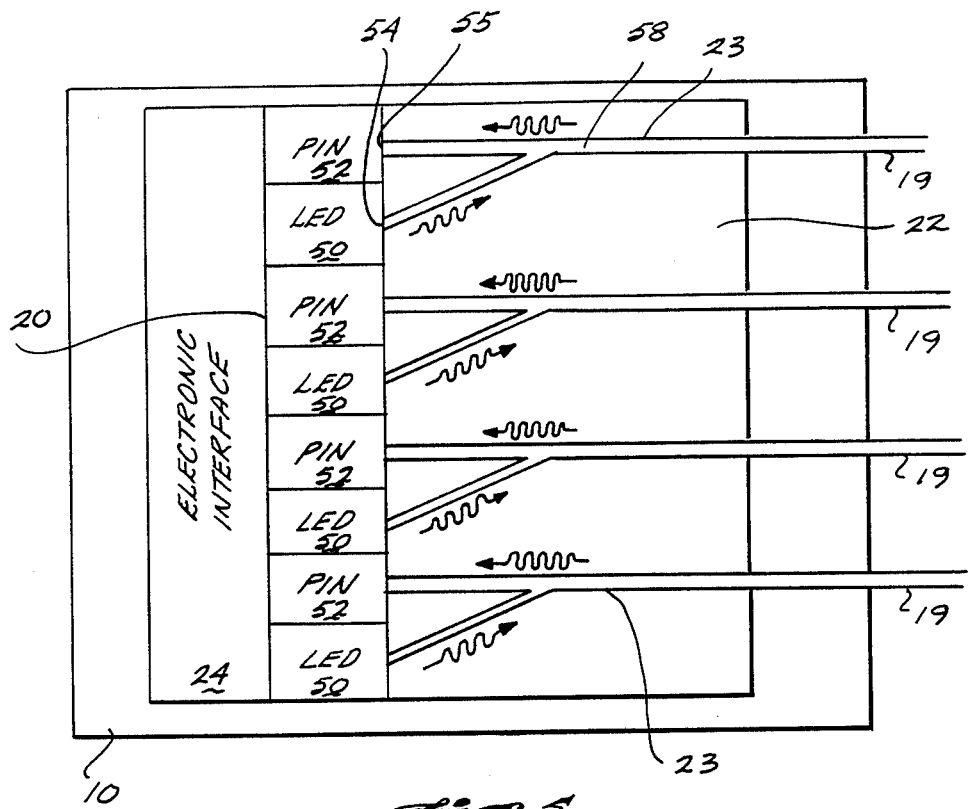
FIG. 5 is a plan view of an optoelectronic bus transceiver having an asymmetric directional coupler array that is used in the backplane configuration of FIG. 1.

Referring now to FIG. 5, the optoelectronic bus transceiver 18 consists of an array 22 of N 2×1 waveguide couplers 23, an array 20 of N-pairs of optical transmitters and receivers, and an electronic interface or multiplexing circuit 24 all affixed to the circuit board 10. In the embodiment illustrated herein, N=4 so that there are four 2×1 waveguide couplers, four pairs of transmitters and receivers, and four optical signal lines 19 for the transceiver. The optoelectronic bus transceiver 18 can be fabricated with either discrete devices, optoelectronic hybrid technology, or monolithic optoelectronic technology.

The array 20 of optical transmitters and receivers illustrated in FIGS. 5 and 1 is an array of alternating light-emitting diodes (LEDs) 50 and PIN photodiodes 52. Methods for fabricating such interleaved arrays of LED transmitters and PIN photodiode receivers in monolithic form are disclosed in U.S. Pat. application Ser.No. 251,134, filed on Sept. 29, 1988, and entitled "Monolithic Interleaved LED/PIN Photodector Array," which is commonly assigned to applicants' assignee. This disclosure of that application is hereby incorporated by reference.

From the discussion of FIG. 1 above, it will be appreciated that the parallel electrical input data fed into the interface circuit 24 is converted to parallel optical signals by the LEDs 50 within the array 20 of optical transmitters. Each of these optical signals enter the respective transmitter port 54 of the 2×1 waveguide coupler 23 with which the LED 50 is associated. The optical signal then travels down the input waveguide 56, through the main waveguide 58 into the signal line 19 and ultimately into the appropriate reflective star coupler array 26. In the reflective star coupler, the optical signal is reflected at the reflective surface 34 and distributed uniformly to the M input ports 32, the V-groove matrix 14 and respective ribbon fiber cable 12, connector 13 and the optoelectronic bus transceiver 18.

A proportional amount of the reflected optical signal power, equal to 1/M (not including coupler excess loss), is directed to the 2×1 coupler 23 and pair of PINs 52 and LEDs 50 from which it originally emerged. Thus, this proportional amount of the reflective optical signal propagates through the main waveguide 58 and a receiver port 55 to the PIN photodiode 52 that is paired with the LED 50 from which the optical signal originated. This received optical signal can be used to monitor the transmitted signal for errors and is equal to the received power at all of the other boards if the attenuation in the fiber paths and connectors is equal and if the power distribution-uniformity of the reflective star coupler is negligible. This leads to a minimum dynamic range requirement at the optical receivers, allowing the receiver to be DC coupled with no preamble required.

The 2×1 waveguide couplers 23 within the optoelectronic bus transceiver can either be standard 50% couplers or, for optimization, asymmetric directional couplers. Where a 50% coupler is used, 50% of the returned power is directed to the optical transmitter and is wasted power. In addition, where the transmitting source is a laser diode or an edge-light emitting diode, the returned power can also cause undesired amplitude modulation. To prevent this undesired amplitude modulation and/or to improve upon the link attenuation, the asymmetric directional coupler is used. Couplers of this type are known, for example, as described by M. Kieli and P. R. Herczfeld, "Aysmmetric Fiber-Optic Coupler for LAN Applications," *J. Lightwave Technology* Vol. LT-4, No. 12, Dec., 1986, pp. 1729-31. A coupler of this type can be fabricated with discrete fibers or planar waveguides on an appropriate substrate.

In general, the requirement to realize an aysmmetric coupler is that the optical transmitter port, for example port 54, must have a reduced mode volume compared to the other two ports of the coupler. Significant Fresnel reflections at optical interfaces and poor 2×1 coupler directivity can cause undesirable reflected optical power directed to the optical receiver. The effect is that the noise level at the receiver is raised proportional to the reflected power and the difference in attenuation paths of the undesired reflection point and the reflection in the reflective star coupler array. Any significant Fresnel reflection and/or poor coupler directivity will limit the performance of the optical backplane. Fresnel reflections at all waveguide/air interfaces of the board connector can be controlled with index matching gel or antireflection coatings. Directivity for the 2×1 couplers can be controlled through selection of the ratio of the output power at the receiver port 55 to the input power at the transmitter port 54.

Figure 6:
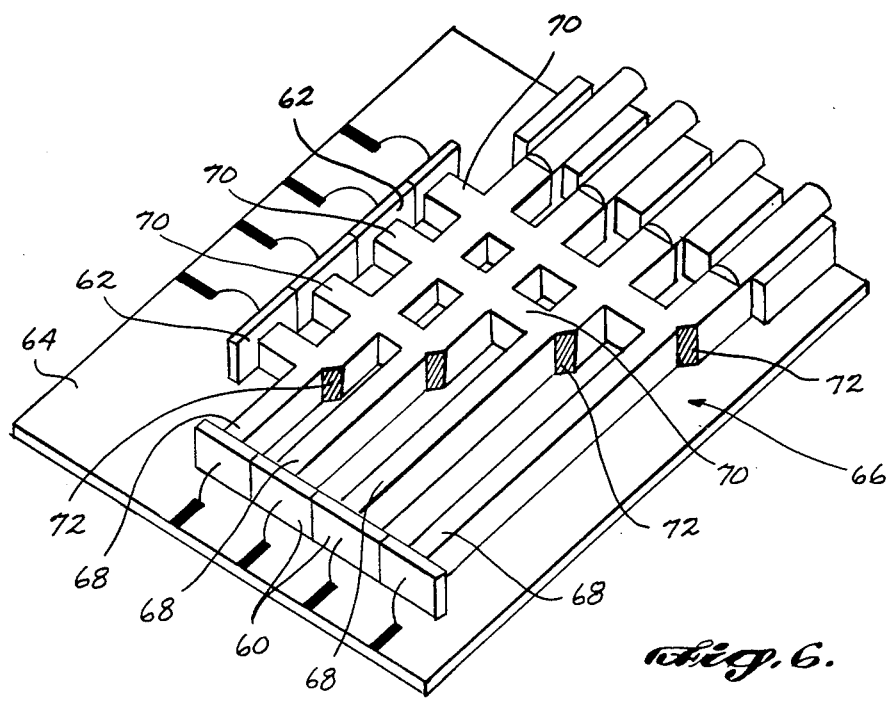
FIG. 6 is a diagrammatic, perspective view of an alternative embodiment of a bus transceiver using a raised waveguide and separate LED and PIN diode arrays.
Figure 7:
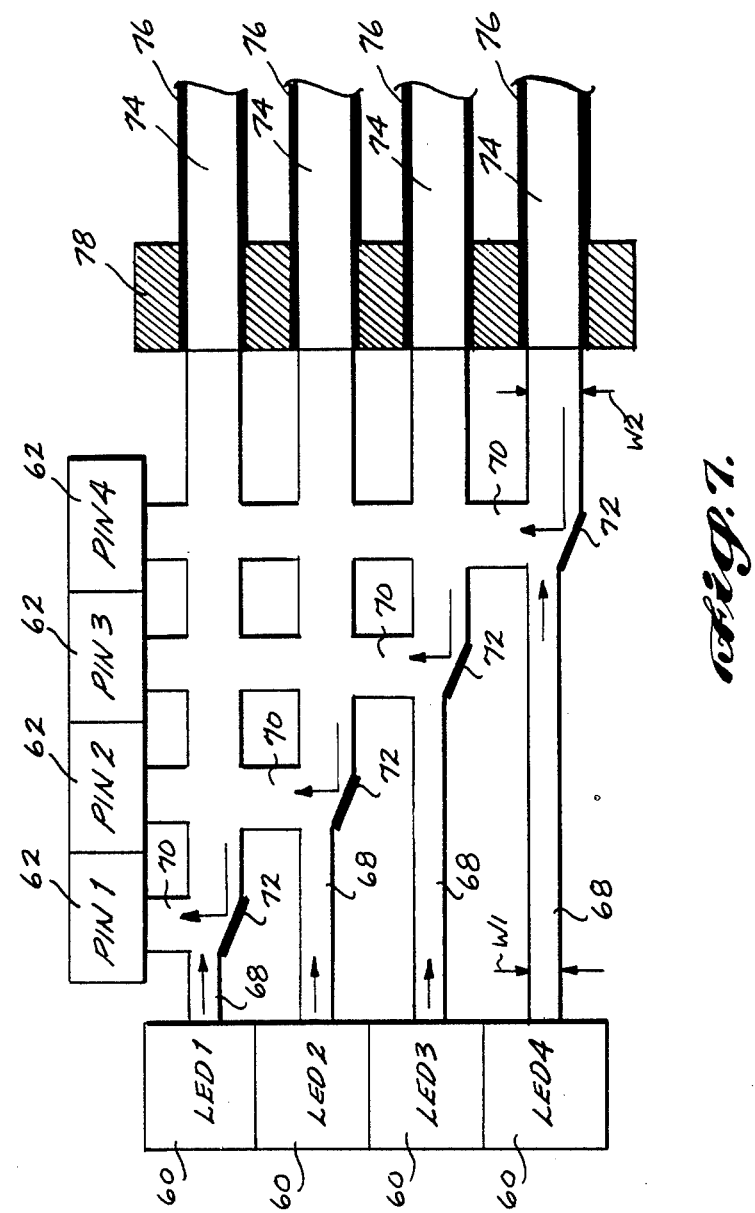
FIG. 7 is a simplified plan view of the transceiver of FIG. 6.

FIGS. 6 and 7 illustrate an alternative embodiment for the optoelectronic bus transceiver 18. In this arrangement, separate, discrete arrays of LEDs 60 and PIN photodiodes 62 are mounted upon a silicon substrate 64 and optically coupled to a "raised" planar waveguide 66 that is formed upon the substrate. Each of the arrays of LEDs and PINs can be discrete devices or monolithic arrays fabricated, for example, using the method disclosed in the aforementioned U.S. Pat. application Ser. No. 251,134.

The raised waveguide 66 is fabricated using conventional planar processing such as that described by M. Kobayashi, M. Yamada, Y. Yamada, A. Himeno, and H. Terui, "Guided-Wave Optical Chip-To-Chip Interconnections", *Electronics Letters*, Vol. 23, No. 4, Feb. 12, 1987, pp. 143-144. The raised waveguide 66 has N=4 transmitter channel waveguides 68, with one of these waveguides being aligned with a discrete one of the LEDs 60. The raised waveguide also has N=4 receiver channel waveguides 70, one of which is associated with and aligned with each one of the PIN photodiodes 62.

As seen best in FIG. 7, a reflector 72 is provided at the "remote" end of each receiver channel waveguide 70, i.e., at the end of the receiver channel waveguide that lies opposite the end to which the pin photodiode 62 is coupled. This end of the receiver waveguide 70 and, hence, the reflector 72, is oriented at an angle of 45% relative to the respective optical axes of the transmitter channel waveguide 68 and the receiver channel waveguide 70. The optical axis of the receiver and transmitter channel waveguides are oriented at right angles. Thus, an optical signal received along one of the transmitter channels 68 is reflected into the appropriate receiver channel waveguide 70 and guided to the associated PIN photodiode 62. The amount of optical power reflected to the PIN photodiodes is controlled through selection of the dimensions of the transmitter channel waveguide 68 on the two sides of the reflector 72. These widths are indicated by the sets of arrows labeled W1 and W2 in FIG. 7. The amount of reflected power is porportional to the ratio between W1 and W2, assuming uniform mode distribution within the waveguide width W2. Thus, if width W1 is one half of the width W2, then one half of the power incident on the reflector 72 is directed to the PIN photodiodes 62.

The "remote" end of each transmitter channel waveguide 68 is aligned with one of the N=4 optical fibers 74 of a fiber ribbon cable. These optical fibers have a cladding 76 and are held in alignment with the receiver channel waveguide 68 by a fiber positioning guide 78.

The raised waveguide arrangement of FIG. 6 and 7 enables the physical separation of the transmitters and receivers. It will be appreciated that this arrangement advantageously avoids the problem of crosstalk that may occur in an interleaved arrangement where the transmitters and receivers and the optical channels thereto are in close physical proximity.

From the foregoing, it will be appreicated that the invention provides techniques for interconnecting electrical circuits in a parallel and broadcast topology using an optical waveguide reflective star coupler array. While the invention has been described with reference to a preferred embodiment, it is to be understood by those skilled in the art that various changes and modifications can be made therein without departing from the spirit and scope of the invention. For example, the reflective star couplers need not be planar waveguides or raised planar waveguides, and can be formed using other fabrication techniques, such as by using a fused biconical taper or looped fiber approach. As well, the optoelectronic bus transceiver can also be configured to accomplish multiplexing functions to increase the data rate per signal line in the bus and parallel to serial data electronic converters can be used for timed division multiplexing and/or wavelength division multiplexing. Hence, within the scope of the appended claims, the invention can be practiced otherwise than as specifically described herein.

I claim:

1. An optical backplane arrangement comprising:
    M circuit boards, each of said circuit boards having an optoelectronic bus transceiver, said optoelectronic bus transceiver having n optical signal lines;
    M optical cables having N optical signal lines, one of said optical cables being connected to the optoelectronic bus transceiver of a specific one of said circuit boards so that each of the N optical signal lines of said optoelectronic bus transceiver is connected to a specific one of the N optical signal lines of said optical cable;
    a reflective star coupler array having N reflective star couplers, each of said reflective star couplers having M guide channels, M input ports and a mixer, each of said guide channels being connected to said mixer and to a respective one of said input ports, said mixer having a reflective surface arranged so that light propagating along any one of said guide channels is reflected by said reflective surface and distributed by said mixer to all of said M guide channels, said reflective star couplers being configured and oriented relative to one another so that said input ports have a predetermined arrangement; and
    an alignment matrix for connecting said optical cables to said reflective star coupler array, said alignment matrix having M×N alignment apertures, said alignment apertures being disposed in said predetermined arrangment so that each aperture holds a specific one of said N optical signal lines in alignment with a specific one of the input ports of said reflective star couplers.

2. The optical backplane arrangement of claim 1, wherein said optical cables comprise fiber optic ribbon cables each having N spaced-apart optical fibers and wherein:
    said alignment matrix comprises M V-groove arrays, each of said V-groove arrays having N generally V-shaped grooves in a surface thereof, said V-grooves being spaced to correspond to the spacing of the optical fibers in said fiber optic ribbon cable, each of said V-groove arrays holding the N optical fibers of a specific one of said fiber optic ribbon cables.

3. The optical backplane arrangement of claim 2, wherein each of said optoelectronic bus transceivers comprises:
    a transceiver array having N optical transmitters and N optical receivers arranged in N-pairs so that one of said transmitters is paired with one of said receivers;
    an electronic interface circuit connected to said transceiver array; and
    an optical coupler array having N 2×1 waveguide couplers, one of said waveguide couplers being coupled to a specific one of said N-pairs of transmitters and receivers.

4. The optical backplane arrangement of claim 3, wherein each of said 2×1 waveguide couplers is an asymmetric coupler.

5. The optical backplane arrangement of claim 4 wherein said transceiver array comprises an interleaved array of light emitting diodes and photodiodes.

6. The optical backplane arrangement of claim 2, wherein each of said optoelectronic but transceivers comprises:
    an array of N optical transmitters;
    an array of N optical receivers;
    an electronic interface circuit connected to said arrays of transmitters and receivers; and
    a raised optical waveguide having N transmitter channels, N receiver channels, and N ports, one of said ports being coupled to a specific one of the optical signal lines of said optical cables, one of said transmitter channels being coupled to a specific one of said N transmitters to guide light launched by said transmitter to a specific one of said ports, one of said receiver channels being coupled to a specific one of said N receivers, each of said transmitter channels having a reflective surface oriented to direct light propagating toward transmitter into a specific one of said receiver channels.

7. An optical coupling arrangement for interconnecting M optical cables in a backplane configuration, each of said optical cables having N optical signal lines to be interconnected in parallel so that the Nth optical signal line of each of the M cables is connected the Nth optical signal line of each other one of said M cables, said coupling arrangement comprising:
    a reflective star coupler array having N reflective star couplers, each of said reflective star couplers having M guide channels, M input ports and a mixer, each of said guide channels being connected to said mixer and to a respective one of said input ports, said mixer having a reflective surface arranged so that light propagating along any one of said guide channels is reflected by said reflective surface and distributed by said mixer to all of said M guide channels, said reflective star couplers being configured and oriented relative to one another so that said input ports have a predetermined arrangement; and
    an alignment matrix for connecting said optical cables to said reflective star coupler array, said alignment matrix having M×N alignment apertures, said alignment apertures being diposed in said predetermined arrangement so that each aperture holds a specific one of said N optical signal lines in alignment with a specific one of the input ports of said reflective star couplers.

8. The optical coupling arrangement of claim 7, wherein said optical cables comprise fiber optic ribbon cables each having N spaced-apart optical fibers and wherein:

said alignment matrix comprises M V-groove arrays, each of said V-groove arrays having N generally V-shaped grooves in a surface thereof, said V-grooves being spaced to correspond to the spacing of the optical fibers in said fiber optic ribbon cable, each of said V-groove arrays holding the N optical fibers of a specific one of said fiber optic ribbon cables.

9. The optical coupling arrangement of claim 7, wherein said optical cables comprise fiber optic ribbon cables each having N spaced-apart optical fibers and wherein:

said alignment matrix comprises N v-groove arrays, each of said V-groove arrays having M generally V-shaped grooves in a surface thereof, said V-grooves being spaced to correspond to the spacing of the input ports in said reflective star couplers, a specific one of said V-groove arrays being associated with a specific one of said reflective star couplers so that the M V-grooves therein are aligned with the M input ports of said reflective star coupler, the Nth V-groove array holding the Mth optical fibers of each of said fiber optic ribbon cables.

10. A method of fabricating a reflective star coupler, comprising:

providing an n×n planar star coupler, said coupler including a mixing region having a length $L_m$;

cutting said planar star coupler in a cross-sectional direction through said mixing region substantially at the midpoint of said length $L_m$ to expose a surface of said mixing region;

polishing the exposed surface of said mixing region and applying a reflective coating thereto.

11. The method of claim 10, wherein said planar star coupler is integrated in a glass substrate and wherein said reflective coating is aluminum.

* * * * *